United States Patent
Lu et al.

(10) Patent No.: US 10,051,099 B2
(45) Date of Patent: Aug. 14, 2018

(54) METHOD FOR SWITCHING WORKING MODE OF HEADPHONE AND HEADPHONE

(71) Applicant: Shenzhen Goodix Technology Co., Ltd., Shenzhen (CN)

(72) Inventors: Saiwen Lu, Shenzhen (CN); Hexing Liu, Shenzhen (CN); Lei Zhao, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/607,426

(22) Filed: May 26, 2017

(65) Prior Publication Data

US 2017/0264728 A1    Sep. 14, 2017

Related U.S. Application Data

(63) Continuation of application No. PCT/CN2016/090636, filed on Jul. 20, 2016.

(30) Foreign Application Priority Data

Feb. 3, 2016 (CN) .......................... 2016 1 0076009

(51) Int. Cl.
*H04W 4/12* (2009.01)
*H04M 1/60* (2006.01)

(52) U.S. Cl.
CPC ........... *H04M 1/6058* (2013.01); *H04W 4/12* (2013.01); *H04R 2201/107* (2013.01); *H04R 2420/07* (2013.01)

(58) Field of Classification Search
CPC ........................ H04M 1/6058; H04M 1/72527
See application file for complete search history.

(56) References Cited

U.S. PATENT DOCUMENTS

| | | | |
|---|---|---|---|
| 2007/0082612 A1 | 4/2007 | Valve et al. | |
| 2012/0190439 A1* | 7/2012 | Nourbakhsh | G02B 27/2264 463/31 |
| 2013/0055103 A1 | 2/2013 | Choi et al. | |

FOREIGN PATENT DOCUMENTS

| | | |
|---|---|---|
| CN | 1992737 A | 7/2007 |
| CN | 101098525 A | 1/2008 |
| CN | 101882948 A | 11/2010 |
| CN | 102164327 A | 8/2011 |
| CN | 102457788 A | 5/2012 |
| CN | 102595265 A | 7/2012 |
| CN | 103209246 A | 7/2013 |
| CN | 103945063 A | 7/2014 |
| CN | 104184496 A | 12/2014 |
| CN | 104284268 A | 1/2015 |

(Continued)

*Primary Examiner* — Tuan H Nguyen

(57) ABSTRACT

A method for switching working mode of a headphone, and a headphone are disclosed. The method includes: receiving, via a sound channel of the headphone, a signal sent by a smart terminal; processing the signal; and when a command indicative of switching the working mode of the headphone is obtained after the signal is processed, controlling, according to the command, a switch module of a microphone channel to switch the working mode such that the headphone is switchable between a call mode and an application data transmission mode. According to the present application, the working mode of the headphone may be automatically switched, and thus user experience may be improved.

20 Claims, 5 Drawing Sheets

(56) References Cited

FOREIGN PATENT DOCUMENTS

| CN | 104581472 | * | 4/2015 | ............. G06F 21/34 |
| CN | 104581472 A | | 4/2015 | |
| KR | 20000025955 A | | 5/2000 | |

* cited by examiner

METHOD FOR SWITCHING WORKING MODE OF HEADPHONE AND HEADPHONE

CROSS-REFERENCE TO RELATED APPLICATIONS

The present application is a continuation of international application No. PCT/CN2016/090636, filed on Jul. 20, 2016, which claims priority to Chinese Patent Application No. CN201610076009.X, filed on Feb. 3, 2016, both of which are hereby incorporated by reference in their entireties.

TECHNICAL FIELD

The present application relates to the field of communication technologies, and in particular, to a method for switching working mode of a headphone and a headphone.

BACKGROUND

A headphone is also called a boomset or receiver and is formed by a pair of conversion units, which receives electric signals sent by a video player or receiver, and converts the electric signals into sound waves that may be heard by using a loudspeaker placed close to ears. With the popularity of smart mobile devices, the headphone is mostly connected to the smart mobile device for use. In the existing communication technologies based on wired headphones, data to be transmitted is modulated on a microphone wire and then transmitted; and meanwhile, call data needs to be transmitted on the microphone wire in a phone call; if instruction data is being modulated and transmitted on the microphone wire when the phone call is made, call quality of the other party will be interfered. Therefore, the call mode and the data transmission mode may not work at the same time. In the prior art, a user needs to manually select the call mode or the data transmission mode. For example, a current working mode may be changed by pressing a hardware switch on a headphone, which increases complexity of user's operations, lowers user experience, and further affects products sales.

SUMMARY

The present application provides a method for switching working mode of a headphone and a headphone, so as to receive, via a sound channel of the headphone, a signal sent by a smart terminal, parse, from the signal, a command indicative of switching the working mode of the headphone, and switch the working mode according to the command, such that the headphone is switchable between a call mode and an application data transmission mode. In this way, phone calls and data transmission do not interfere with each other, automatic switching of the working mode of the headphone is implemented, and convenience of operations is improved.

The present application provides a method for switching working mode of a headphone, which includes: receiving, via a sound channel of the headphone, a signal sent by a smart terminal; processing the signal; and when a command indicative of switching the working mode of the headphone is obtained after the signal is processed, controlling, according to the command, a switch module of a microphone channel to switch the working mode such that the headphone is switchable between a call mode and an application data transmission mode, wherein the microphone channel is a channel formed via an electrical connection between a microphone of the headphone and the smart terminal.

The present application provides a headphone, which includes: a data receiving module, configured to receive, via a sound channel of the headphone, a signal sent by a smart terminal; a data processing module, configured to process the signal; and a control module, configured to, when a command indicative of switching the working mode of the headphone is obtained after the signal is processed, control, according to the command, a switch module of a microphone channel to switch the working mode such that the headphone is switchable between a call mode and an application data transmission mode, wherein the microphone channel is a channel formed via an electrical connection between a microphone of the headphone and the smart terminal.

It may be known from an embodiment of the present application, a headphone receives, via a sound channel, a signal sent by a smart terminal; and when a command indicative of switching working mode of the headphone is obtained after the signal is processed, controls, according to an instruction of the command, a switch module of a microphone channel to switch the working mode of the headphone, that is, the working mode of the headphone is switched to a call mode or an application data transmission mode. In this two working modes, transmission of application data and phone call will not interfere with each other, such that an automatic switching of the working mode is implemented in the headphone, convenience of operations is increased, and then user experience is improved.

BRIEF DESCRIPTION OF THE DRAWINGS

To more clearly describe technical solutions according to the embodiments of the present application or in the prior art, drawings that are to be referred for description of the embodiments or the prior art are briefly described hereinafter. Apparently, the drawings described hereinafter merely illustrate some embodiments of the present application. Persons of ordinary skill in the art may also derive other drawings based on the drawings described herein without any creative effort.

DETAILED DESCRIPTION

To make the objectives, technical features, and advantages of the present application clearer and more understandable, the technical solutions according to the embodiments of the present application are further described in detail with reference to the accompany drawings. Apparently, the embodiments described herein are merely some exemplary ones, rather than all the embodiments of the present application. Based on the embodiments of the present application, all other embodiments derived by persons of ordinary skill in the art without any creative efforts shall fall within the protection scope of the present application.

Figure 1:
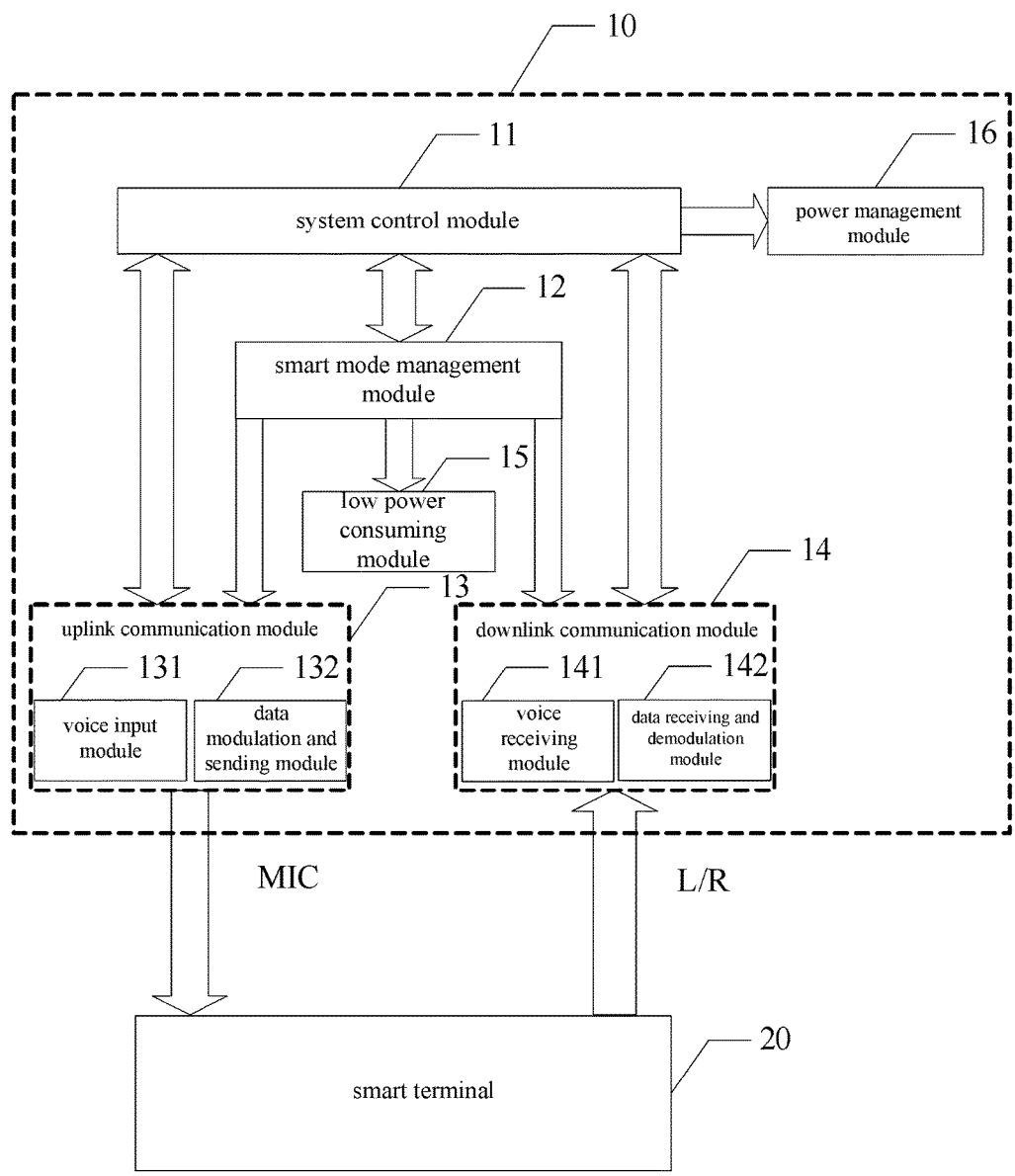
FIG. 1 is a schematic diagram of an application scenario of a method for switching working mode of a headphone according to Embodiment 1 of the present application.
Figure 2:
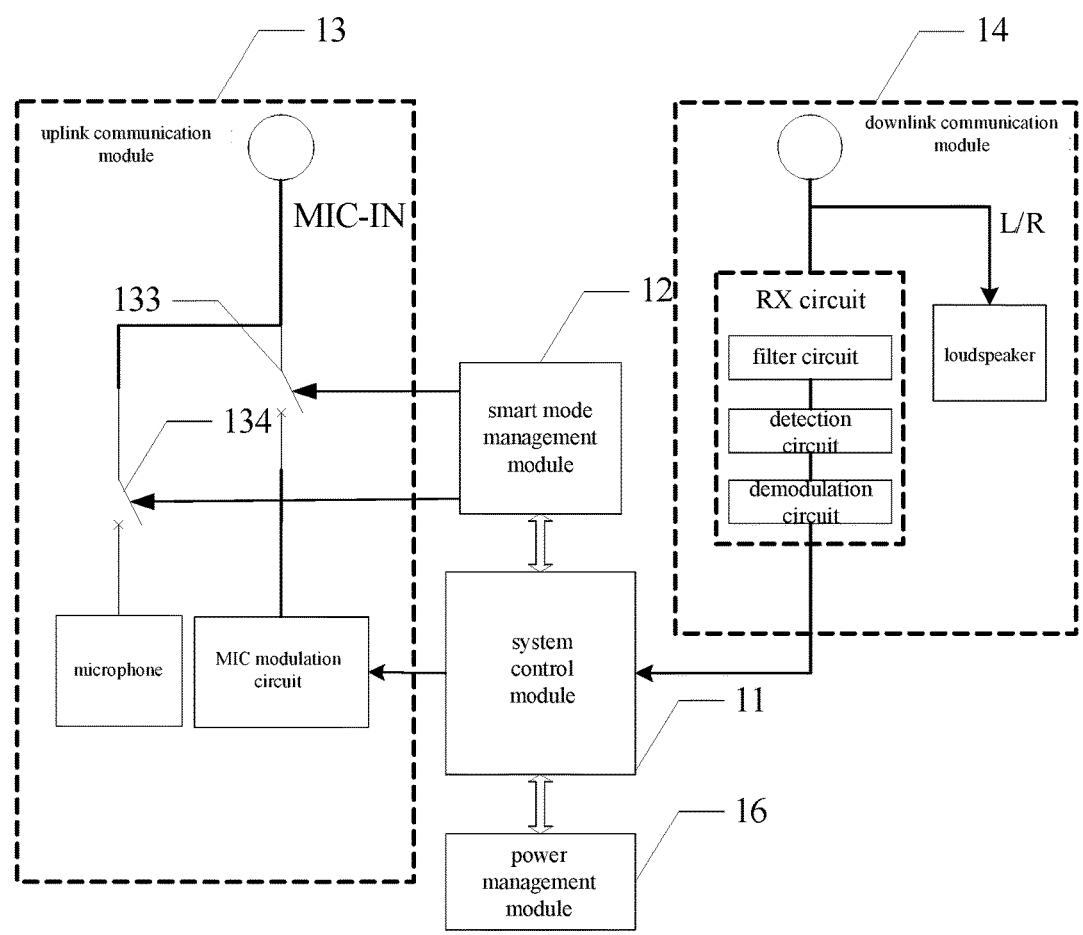
FIG. 2 is a schematic structural diagram of a headphone according to an embodiment of the present application.

Referring to FIGS. 1 and 2, FIG. 1 is a schematic diagram of an application scenario of a method for switching working mode of a headphone according to an embodiment of the present application. FIG. 1 illustrates a headphone 10 and a smart terminal 20 connected to the headphone 10 via a microphone wire and a sound channel wire. FIG. 2 is a specific circuit diagram of the headphone 10.

The smart terminal 20 is configured to, when it is detected that a phone call comes or a current phone call ends, construct a command packet indicative of switching the working mode of the headphone. The command packet includes a command indicative of switching the working mode of the headphone, wherein the command is configured to instruct the headphone to control a switch module of a microphone channel to switch the working mode of the headphone, wherein switching the working mode refers to switching between a call mode and an application data transmission mode. The call mode refers to that when the headphone is in this working mode, call voice instead of application data is transmitted on a microphone channel; and the application data transmission mode refers to that when the headphone is in this working mode, the application data instead of the call voice is transmitted. The application data refers to human biological characteristic data of a user collected by a headphone, wherein the human biological characteristic data includes heartbeat data, blood pressure data, respiratory frequency data, or the like.

The smart terminal 20 modulates the command packet into a data in a preset frequency. To prevent interference caused to a general audio signal when the data in the preset frequency is transmitted, a difference between the preset frequency and the general audio frequency is greater than a preset value, and the smart terminal 20 sends the modulated data to the headphone 10 via any sound channel of the headphone 10. Specifically, when it is detected that a phone call comes, the modulated data is sent to the headphone 10 via a left sound channel or a right sound channel of the headphone 10, or both the left sound channel and the right sound channel at the same time in a ringing manner. When it is detected that no phone call comes, the manner of sending the modulated data to the headphone 10 via the left and/or right sound channel of the headphone 10 is not limited. While the command packet is sent, the smart terminal 20 may also send other audio signals or music signals to the headphone 10 via the sound channel.

The headphone 10 is configured to: receive the signal sent by the smart terminal 20, and process the signal; and when a command indicative of switching the working mode of the headphone is obtained after the signal is processed, control, according to an instruction of the command, a switch module of a microphone channel to switch the working mode, that is, to switch the current working mode of the headphone 10 to a call mode or to an application data transmission mode. The microphone channel is a channel formed via an electrical connection between a microphone of the headphone and the smart terminal. Specifically, the microphone channel is a channel formed via an electrical connection between a microphone wire of a wired headphone and the smart terminal, or a channel formed via a radio connection between a microphone of a wireless headphone and the smart terminal.

Specifically, the headphone 10 includes: a system control module 11, a smart mode management module 12, an uplink communication module 13, a downlink communication module 14, a low power consuming module 15, and a power management module 16.

The uplink communication module 13 may further include a voice input module 131 and a data modulation and sending module 132. The downlink communication module 14 may further include a voice receiving module 141 and a data receiving and demodulation module 142.

Specifically, the system control module 11 is configured to receive, via the downlink communication module 14, the signal sent by the smart terminal 20, parse the command indicative of switching the working mode of the headphone of the smart terminal 20 after performing decoding and checking for the signal, and control modules of the headphone 10 to coordinately run according to the working mode of the headphone 10 and the command.

The smart mode management module 12 is configured to receive an instruction from the system control module 11 with no need of manual intervention, intelligently control the internal modules of the uplink communication module 13, and the downlink communication module 14 to coordinately work, and in the meantime, manage the low power consuming module 15, such that data communication and voice call may coordinately work to satisfy the requirements of the low power consumption system.

The uplink communication module 13 is configured to connect to the smart terminal 20 via the microphone wire, and send call voice and the application data to the smart terminal 20 via the microphone wire. It may be understood that, in a wired headphone, the uplink communication module 13 is connected to the smart terminal 20 via the microphone wire, and in a wireless headphone, the uplink communication module 13 is connected to the smart terminal 20 via a wireless microphone channel.

Further, the uplink communication module 13 includes the voice input module 131 and a data modulation and sending module 132. In a specific circuit, referring to FIG. 2, the voice input module 131 mainly includes the microphone, and the data modulation and sending module 132 includes a MIC modulation circuit. The voice input module 131 is configured to implement a call function of the headphone 10. The data modulation and sending module 132 is configured to modulate a voltage of the microphone wire by controlling switching of the microphone wire between a modulation resistor and a power consuming module, such that a modulation signal in mV level is loaded to the voltage of the microphone wire, and send the modulated data to the smart terminal 20.

The switch module is disposed in the uplink communication module 13, and includes a first switch 133 and a second switch 134. The first switch 133 and the second switch 134 are switched on or switched off under the control of the smart mode management module 12. The first switch 133 is connected between modulation circuit and a microphone input module of the smart terminal; when the first switch 133 is switched on, the modulation circuit is connected to the microphone input module of the smart terminal; and when the first switch 133 is switched off, the modulation circuit is disconnected from the microphone input module. The second switch 134 is connected between the microphone and the microphone input module; when the second switch 134 is switched on, the microphone is connected to the microphone input module; and when the second switch is switched off, the microphone is disconnected from the microphone input module. The microphone input module is a MIC IN as illustrated in FIG. 2.

Figure 3:
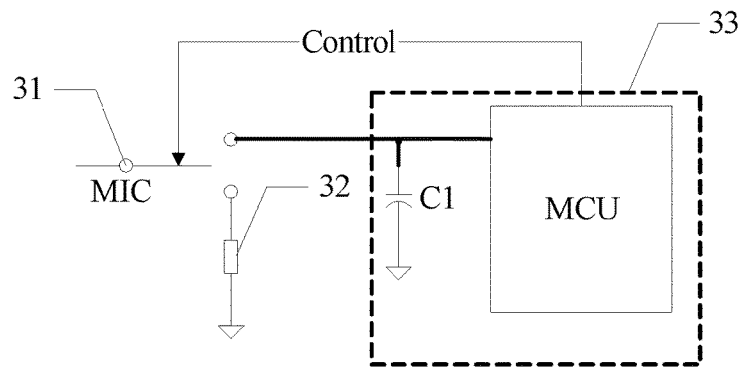
FIG. 3 is a schematic diagram of a MIC modulation circuit in FIG. 2.

FIG. 3 is a specific diagram of a MIC modulation. The MIC modulation circuit modulates a voltage of a MIC 31 by controlling switching of the MIC 31 between a modulation resistor 32 and a power consuming module 33, such that a modulation signal in mV level is loaded to the voltage of the MIC 31. The modulation signal is transmitted to an audio codec (compress/decompress) chip of the smart terminal for analog-to-digital conversion and processing.

It should be noted that, since the data modulated by the data modulation and sending module 132 is not a signal in a single frequency, and generally includes some low-frequency signal components which could be heard by people's ears. In the call mode, these signals which could be heard by the people's ears will interfere with the call quality. Therefore, in the call mode, the data modulation and sending module 132 needs to be disabled, and only the voice input module 131 is enabled for making a call, which prevents the data modulation and sending module 132 from generating modulated data and thus causing interference to the quality of the call of the voice input module 131.

The downlink communication module 14 is configured to connect to the smart terminal 20 via the left and/or right sound channel, and continuously monitor and receive the signal sent by the smart terminal 20, wherein the signal may include the modulated data in the preset frequency that is modulated from the command packet for switching the working mode of the headphone, and other voice or music signals.

The data receiving and demodulation module 142 receives the signal sent by the smart terminal 20; firstly filters the received signal to remove an audio signal within the preset frequency range, wherein the audio signal may come from audio signals or music signals generated by videos or audios that are being played by the smart terminal; then filters or attenuates other signals that are not within the preset frequency range by using a filtering module having frequency selective features; and finally demodulate the data obtained upon filtering to obtain a signal that may be identified by the system control module 11, and transmits the signal to the system control module 11 for processing.

Further, the downlink communication module 14 includes the voice receiving module 141 and the data receiving and demodulation module 142. In a specific circuit, referring to FIG. 2, the voice receiving module 141 includes a loudspeaker. After the loudspeaker is connected via the left sound channel and/or the right sound channel, such voice receiving functions as receiving call voice and music, and the like. The data receiving and demodulation module 142 includes an RX circuit, wherein the RX circuit includes a filter circuit, a detection circuit and a demodulation circuit. The RX circuit receives signals input from the left sound channel and/or the right sound channel. These signals may meanwhile include audio signals and command signals corresponding to command information that are sent by the smart terminal 20. The voice signal is generally a low-frequency signal, and the command signal is generally a high-frequency signal that may not be heard by ears, for example, a signal having a frequency of 20 KHz. After the RX circuit receives these signals, these signals are firstly filtered by the filter circuit to remove the audio signals, then the signals having a frequency of 20 KHz are extracted by the detection circuit, and finally the square wave is generated after the extracted signals having a frequency of 20 KHz are processed by the demodulation circuit. The square wave is then transmitted to the system control module 11 to obtain a data packet via decoding, the data packet is checked, and upon successful check, the data packet is parsed to obtain command information.

Furthermore, the voice receiving module 141 and the data receiving and demodulation module 142 may be simultaneously connected to the left sound channel and right sound channel, and work together with the left sound channel and right sound channel. Alternatively, the voice receiving module 141 and the data receiving and demodulation module 142 may be controlled by the smart mode management module 12 to conduct the connection or to cut off the connection with the left sound channel or the right sound channel.

The low power consuming module 15 is configured to lower the power consumption of the headphone 10; and the smart mode management module 12 controls, according to the power consumption state of the headphone, the system of the headphone to enter the low power consuming module 15 to satisfy the requirements of the low power consumption of the headphone. In the low power consumption mode, the headphone may still normally work, and causes no interference to the switching between the application data communication mode and the call mode, and the work in these two working modes.

The power management module 16 is configured to supply power to the headphone 10, which is not limited to a self-power supply mode or an external power supply mode.

Specific working processes of the headphone 10 and the smart terminal 20 are described hereinafter.

Prior to sending the signal to the headphone 10 via the downlink communication module 14, the smart terminal 20 modulates data to be sent to the headphone 10 into data which may not be heard or sensed by the people's ears, and the data to be sent may include the command indicative of switching the working mode of the headphone. In this case, even though music is simultaneously played, during transmission of the data, people may still listen to the music with ears. In this way, the data and the voice signal are simultaneously transmitted, and parallel work is implemented, such that the user simultaneously sends the data to the headphone via the sound channel of the headphone when listening to the music.

The system control module 11 receives the signal sent by the downlink communication module 14, wherein the signal is sent by the smart terminal 10 to the downlink communication module 14. The downlink communication module 14 performs filtering and demodulation for the signal sent by the smart terminal, and demodulates the signal into data that may be identified by the system control module 11. The system control module 11 decodes the demodulated data to obtain a data packet, performs validity identification check for the data packet, parses the command indicative of switching the working mode of the headphone from the data packet upon successful check, and according to the command, instructs the smart mode management module 12 to control the voice input module 131 or the data modulation and sending module 132 in the uplink communication module 13 to connect to the microphone wire, such that the voice input module 131 or the data modulation and sending module 132 is connected to an interface of the MIC of the smart terminal 20, and the headphone 10 and the smart terminal 20 enter the call mode or the application data transmission mode, and establish a physical connection channel for implementing a corresponding voice call function or a data communication function. The voice call function and the data communication function cause no interference to the physical connection of the smart terminal 20, and they coordinately work.

Further, if the headphone 10 receives the command indicative of switching to the application data transmission mode, the smart mode management module 12 controls the data modulation and sending module 132 to connect to the microphone wire. The headphone 10 and the smart terminal 20 enter the application data transmission mode; and after packing and coding application data to be sent, the system control module 11 controls the data modulation and sending module 132 to send the application data to the smart terminal 20 via the microphone wire.

If the headphone 10 receives the command indicative of switching to the call mode, the headphone quits the application data transmission mode; and the system control module 11 stops modulating the application data, disables the data modulation and sending module 132, and instructs the smart mode management module 12 to control the data modulation and sending module 132 to cut off the connection with the microphone wire, and control the voice input module 131 to connect to the microphone wire, such that the headphone 10 and the smart terminal 20 enter a call state. In this case, after the call is connected, the user may make a conversation with other party of the call via the voice input module 131.

Figure 4:
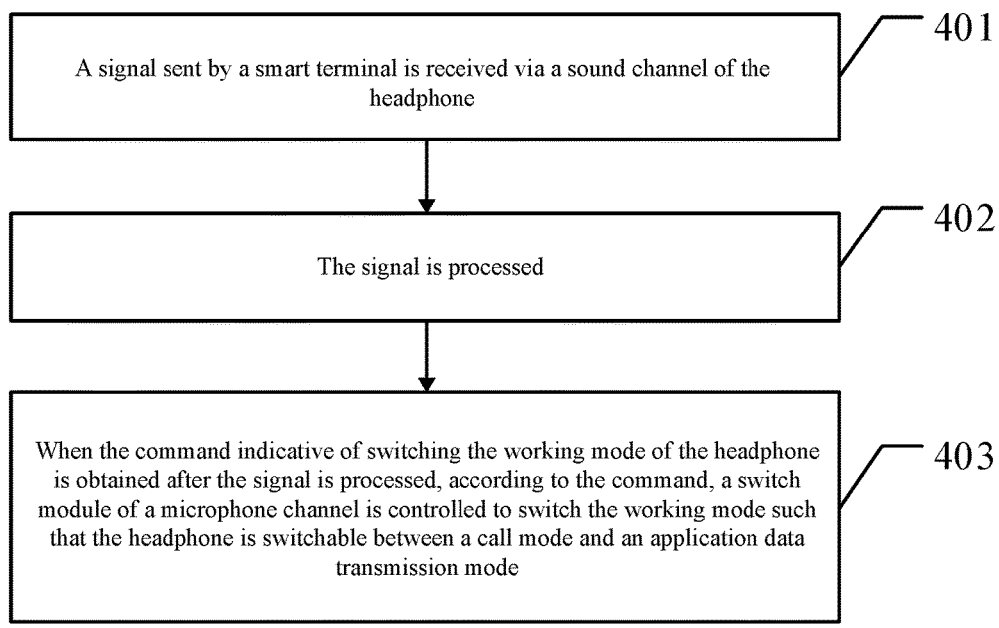
FIG. 4 is a schematic flowchart of a method for switching working mode of a headphone according to Embodiment 2 of the present application.

Referring to FIG. 4, FIG. 4 is a schematic flowchart diagram of a method for switching working mode of a headphone according to Embodiment 1 of the present application, wherein the method includes the following steps.

S401. A signal sent by a smart terminal is received via a sound channel of the headphone.

The headphone receives, via any sound channel, the signal sent by the smart terminal connected to the headphone, wherein receiving the signal via any sound channel refers to receiving via a left sound channel or a right sound channel, or both the left sound channel and the right sound channel at the same time.

When it is detected that a phone call comes or a phone call ends, the smart terminal constructs a command indicative of switching the working mode of the headphone, such that the headphone switches the working mode according to the command after receiving the command, wherein switching the working mode refers to that when the headphone is in this working mode, call voice instead of application data is transmitted on a microphone channel; and the application data transmission mode refers to that when the headphone is in this working mode, the application data instead of the call voice is transmitted. The application data is human biological characteristic data of a user collected by a headphone, wherein the human biological characteristic data includes heartbeat data, blood pressure data, respiratory frequency data, or the like.

Further, the smart terminal modulates a command packet including the command into data in a preset frequency, and a difference between the preset frequency and a general audio frequency is greater than a preset value, that is, the preset frequency is far greater than the general audio frequency, for example, a signal having a frequency of 20 KHz, such that the modulated data is not easily detected by people's ears. In this way, people may still listen to the voice or music in the general audio frequency with ears when data in the preset frequency is transmitted via the sound channel, wherein the voice or the music may come from videos or audios played by the smart terminal.

S402. The signal is processed.

The headphone processes the signal received from the smart terminal. The signal may include the command indicative of switching the working mode of the headphone, and audio signals of audios or videos played by the smart terminal, wherein the audio signals include voice signals or music signals.

S403. When the command indicative of switching the working mode of the headphone is obtained after the signal is processed, according to the command, a switch module of a microphone channel is controlled to switch the working mode such that the headphone is switchable between a call mode and an application data transmission mode.

The microphone channel is a channel formed via an electrical connection between a microphone of the headphone and the smart terminal.

When a command indicative of switching the working mode of the headphone is obtained after the signal is processed, according to the command, the switch module of the microphone channel is controlled to automatically switch the working mode of the headphone such that the headphone is switchable between the call mode and the application data transmission mode.

In an embodiment of the present application, a headphone receives, via a sound channel, a signal sent by a smart terminal; and when a command indicative of switching working mode of the headphone is obtained after the signal is processed, controls, according to an instruction of the command, a switch module of a microphone channel to switch the working mode of the headphone, that is, the working mode of the headphone is switched to a call mode or an application data transmission mode. In this two working modes, transmission of application data and phone call will not interfere with each other, such that an automatic switching of the working mode is implemented in the headphone, convenience of operations is increased, and then user experience is improved.

Figure 5:
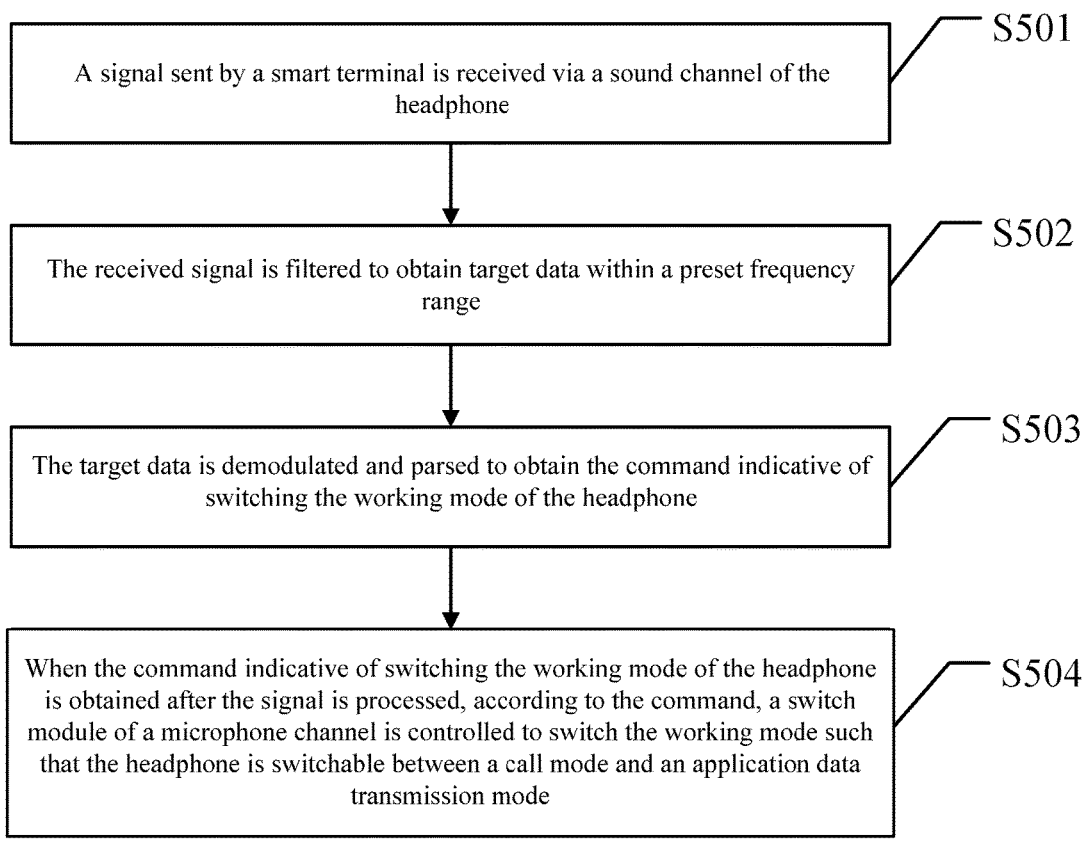
FIG. 5 is a schematic flowchart of a method for switching working mode of a headphone according to Embodiment 3 of the present application.

Referring to FIG. 5, FIG. 5 is a schematic flowchart diagram of a method for switching working mode of a headphone according to Embodiment 2 of the present application, wherein the method mainly includes the following steps.

S501. A signal sent by a smart terminal is received via a sound channel of the headphone.

The headphone receives the signal sent by the smart terminal connected to the headphone via any sound channel.

The signal may further include an audio signal sent together with a command indicative of switching the working mode of the headphone, and the audio signal may be, for example, voice signals of audios or videos and music signals that are played by the smart terminal. The command indicative of switching the working mode of the headphone is modulated into data in a preset frequency, and the preset frequency may be far greater than the frequency of a general audio signal. Therefore, the command indicative of switching the working mode of the headphone and other audio signals may be transmitted at the same time on the sound channel, such that a user may still normally listen to other audio signals while the command is transmitted.

S502. The received signal is filtered to obtain target data within a preset frequency range.

The headphone filters audio signals within the preset frequency range from the received data, and the audio signals include voice signals or music signals. In addition, all the signals that are not within the preset frequency range are filtered or attenuated by using a filtering module having frequency selective features to obtain the target data within the preset frequency range.

Initial filtering of the signal may improve efficiency and accuracy in processing the data.

S503. The target data is demodulated and parsed to obtain the command indicative of switching the working mode of the headphone.

Specifically, the headphone demodulates the target data, and performs validity identification check for the demodulated target data; and if the demodulated target data passes the validity identification check, the headphone parses the demodulated target data.

The headphone demodulates the target data and performs validity identification check for the demodulated target data. To be specific, the headphone detects validity and integrity of the demodulated target data, and whether the demodulated target data may be identified by a module controlling system running in the headphone, for example, the system control module 11 in FIG. 1.

The validity identification check for the demodulated target data may further improve efficiency in parsing the command indicative of switching the working mode of the headphone.

S504. When the command indicative of switching the working mode of the headphone is obtained after the signal is processed, according to the command, a switch module of a microphone channel is controlled to switch the working mode such that the headphone is switchable between a call mode and an application data transmission mode.

The microphone channel is a channel formed via an electrical connection between a microphone of the headphone and the smart terminal.

Specifically, if the command is indicative of switching to the application data transmission mode, the switch module is controlled to conduct an electrical connection between a modulation circuit and the microphone channel to switch the headphone to the application data transmission mode, such that the headphone sends, via the microphone channel, application data modulated by the modulation circuit to the smart terminal. The application data includes the human biological characteristic data collected by a headphone.

If the command is indicative of switching to the call mode, the switch module is controlled to cut off the electrical connection between the modulation circuit and the microphone channel, and the switch module is enabled to conduct the electrical connection between the microphone and the microphone channel to stop sending application data modulated by the modulation circuit to the smart terminal, and start transmitting call data on the microphone channel.

The microphone channel is a channel formed via an electrical connection between a microphone wire of a wired headphone and the smart terminal, or a channel formed via a radio connection between a microphone of a wireless headphone and the smart terminal.

The switch module is disposed in an uplink communication module 13, and includes a first switch and a second switch. The first switch is connected between the modulation circuit and a microphone input module of the smart terminal; when the first switch is switched on, the modulation circuit is connected to the microphone input module of the smart terminal; and when the first switch is switched off, the modulation circuit is disconnected from the microphone input module. The second switch is connected between the microphone and the microphone input module; when the second switch is switched on, the microphone is connected to the microphone input module; and when the second switch is switched off, the microphone is disconnected from the microphone input module.

The headphone sends, via the microphone channel, the application data to the smart terminal, which will not affect quality of music that the smart terminal plays to the headphone simultaneously on a sound channel of the headphone, and will not affect listening to the music by a user via the headphone.

For further description of this embodiment, for example, when detecting that the headphone currently enters the call state, the smart terminal well constructs the command indicative of switching to the call mode, modulates a command packet including the command into a signal having a frequency to which people's ears are insensitive, for example, a signal having a frequency of 20 KHz, afterwards, applies for audio use authority from the system, sends the modulated signal to the headphone via the left sound channel in a ringing manner, and releases the audio use authority. The headphone receives the signal sent by the smart terminal, performs filtering, detection and demodulation for the signal, decodes the command packet in the signal, performs validity identification check for the command packet, and parses the command from the command packet after the check is successful; according to the command, the headphone stops sending the application data modulated by the modulation circuit to the smart terminal, cuts off the connection between the modulation circuit and the microphone wire, and quits the application data transmission mode. In this case, the user may normally use a call function of the headphone. Afterwards, the smart terminal continuously detects the phone call state. When detecting that the phone call ends, the smart terminal well constructs the command indicative of switching to the application data transmission mode, modulates the command packet including the command into a signal having a frequency of 20 KHz, and sends the modulated signal to the headphone via the left sound channel. The headphone receives the signal sent by the smart terminal, and performs filtering, detection and demodulation for the signal, decodes the command packet, performs validity identification check for the command packet, and parses the command from the command packet upon successful check; according to the command, the headphone conducts again the connection between the modulation circuit and the microphone wire, switches to the application data transmission mode, and continuously sends the application data to the smart terminal.

Further, the power consumption state of the headphone is detected. When it is detected that the power consumption state satisfies a preset condition which indicates that power consumption is high and needs to be lowered, the headphone is controlled to work in a preset low power consumption mode. During maintenance of normal work, the low power consumption mode needs to be kept to reduce the power consumption.

In an embodiment of the present application, a headphone receives, via a sound channel, a signal sent by a smart terminal; and when a command indicative of switching working mode of the headphone is obtained after the signal is processed, controls, according to an instruction of the command, a switch module of a microphone channel to switch the working mode of the headphone, that is, the working mode of the headphone is switched to a call mode or an application data transmission mode. In this two working modes, transmission of application data and phone call will not interfere with each other.

As such, automatic switching of the working mode in the headphone is achieved, user experience is improved, and product retention is increased.

Figure 6:
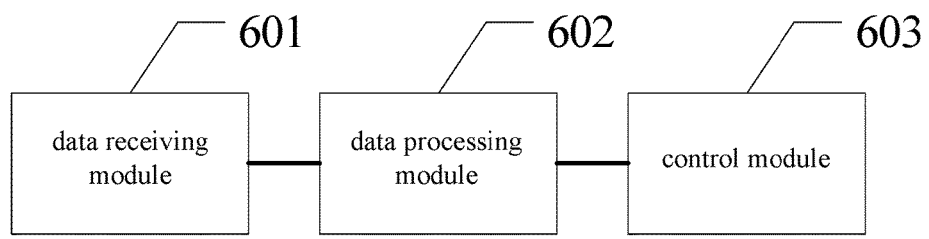
FIG. 6 is a schematic structural diagram of a headphone according to Embodiment 4 of the present application.

Referring to FIG. 6, FIG. 6 is a schematic structural diagram of a headphone according to Embodiment 3 of the present application. For ease of description, parts relevant to the embodiments of the present application are only illustrated. The headphone as illustrated in FIG. 6 may be the headphone provided in the foregoing embodiments as illustrated in FIGS. 4 and 5. The device includes a data receiving module 601, a data processing module 602 and a control module 603.

The above functional modules are described hereinafter in detail.

The data receiving module 601 is configured to receive, via a sound channel of the headphone, a signal sent by a smart terminal.

The data processing module 602 is configured to process the signal. The control module 603 is configured to, when a command indicative of switching the working mode of the headphone is obtained after the signal is processed, control, according to the command, a switch module of a microphone channel to switch the working mode such that the headphone is switchable between a call mode and an application data transmission mode.

The microphone channel is a channel formed via an electrical connection between a microphone of the headphone and the smart terminal.

For details that are not thoroughly described in this embodiment, reference may be made to the description in the foregoing embodiments as illustrated in FIGS. 1 to 5, which is not described herein any further.

It should be noted that, in the embodiment of the headphone as illustrated in FIG. 6, the headphone is described by only using division of the above functional modules as an example. In practice, the functions may be assigned to different functional modules for implementation as required, for example, configuration requirements of corresponding hardware, or consideration of convenience of implementing software. To be specific, the internal structure of the headphone is divided into different functional modules to implement all or part of the above-described functions. In addition, in practice, the corresponding functional modules in this embodiment may be practiced by corresponding hardware, or may be practiced by means of running corresponding software by the corresponding hardware. The embodiments provided in the present disclosure may observe the above description principles, which are not described hereinafter any further.

In an embodiment of the present application, a headphone receives, via a sound channel, a signal sent by a smart terminal; and when a command indicative of switching working mode of the headphone is obtained after the signal is processed, controls, according to an instruction of the command, a switch module of a microphone channel to switch the working mode of the headphone, that is, the working mode of the headphone is switched to a call mode or an application data transmission mode. In this two working modes, transmission of application data and phone call will not interfere with each other, such that an automatic switching of the working mode is implemented in the headphone, convenience of operations is increased, and then user experience is improved.

Figure 7:
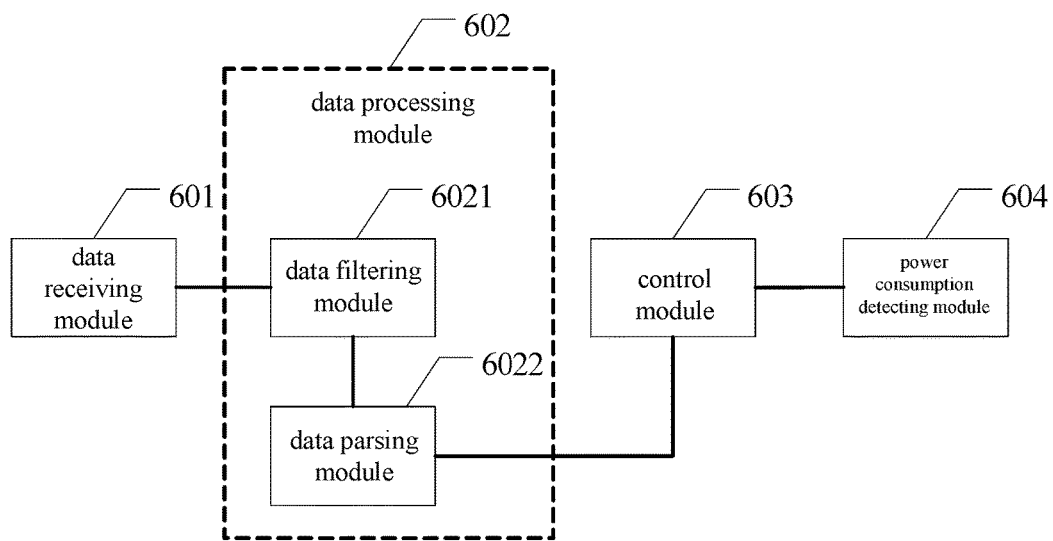
FIG. 7 is a schematic structural diagram of a headphone according to Embodiment 5 of the present application.

Referring to FIG. 7, a schematic structural diagram of a headphone according to Embodiment 4 of the present application is similar to an apparatus in the embodiment as illustrated in FIG. 6, and the differences are described herein after.

Further, the control module 603 is specifically configured to, if the command is indicative of switching to the application data transmission mode, control the switch module to conduct an electrical connection between a modulation circuit and the microphone channel to switch the headphone to the application data transmission mode, such that the headphone sends, via the microphone channel, application data modulated by the modulation circuit to the smart terminal; and if the command is indicative of switching to the call mode, control the switch module to cut off the electrical connection between the modulation circuit and the microphone channel, and enable the switch module to conduct the electrical connection between the microphone and the microphone channel to stop sending application data modulated by the modulation circuit to the smart terminal, and start transmitting call data on the microphone channel.

Furthermore, the microphone channel is a channel formed via an electrical connection between a microphone wire of a wired headphone and the smart terminal, or a channel formed via a radio connection between a microphone of a wireless headphone and the smart terminal.

The switch module is disposed in an uplink communication module, and includes a first switch and a second switch. The first switch is connected between the modulation circuit and a microphone input module of the smart terminal; when the first switch is switched on, the modulation circuit is connected to the microphone input module of the smart terminal; and when the first switch is switched off, the modulation circuit is disconnected from the microphone input module. The second switch is connected between the microphone and the microphone input module; when the second switch is switched on, the microphone is connected to the microphone input module; and when the second switch is switched off, the microphone is disconnected from the microphone input module.

The signal further includes an audio signal simultaneously sent by the smart terminal when the smart terminal sends the command indicative of switching the working mode of the headphone.

Furthermore, the data processing module 602 further includes:

a data filtering module 6021, configured to filter a received signal to obtain target data within a preset frequency range; and a data parsing module 6022, configured to demodulate and parse the target data to obtain the command indicative of switching the working mode of the headphone.

The data filtering module 6021 is specifically configured to filter an audio signal within the preset frequency range, and filter or attenuate all signals that are not within the preset frequency range.

The data parsing module 6022 is specifically configured to demodulate the target data, and perform validity identification check for the demodulated target data; and if the demodulated target data passes the validity identification check, parse the demodulated target data.

The data receiving module 601 is specifically configured to receive, via a left and/or right sound channel of the headphone in a ringing manner, the signal sent by the smart terminal.

The headphone may further include:

a power consumption detecting module 604, configured to detect a power consumption state of the headphone.

wherein the control module 603 is further configured to, when the power consumption state satisfies a preset condition, control the headphone to enter a preset low power consumption mode to work.

For details that are not thoroughly described in this embodiment, reference may be made to the description in the foregoing embodiments as illustrated in FIGS. 1 to 6.

In an embodiment of the present application, a headphone receives, via a sound channel, a signal sent by a smart terminal; and when a command indicative of switching working mode of the headphone is obtained after the signal is processed, controls, according to an instruction of the command, a switch module of a microphone channel to switch the working mode of the headphone, that is, the working mode of the headphone is switched to a call mode or an application data transmission mode. In this two working modes, transmission of application data and phone call will not interfere with each other, such that an automatic switching of the working mode is implemented in the headphone, convenience of operations is increased, and then user experience is improved.

In the several embodiments provided in the present application, it should be understood that the disclosed apparatus and method may be practiced in other manners. The above described apparatus embodiments are merely illustrative. For example, the module division is merely logical function division and may be other divisions in actual practice. For example, multiple modules or components may be combined or integrated into another device, or some features can be ignored or not performed. In addition, the displayed or discussed mutual couplings or direct couplings or communication connections may be implemented through some interfaces. The indirect couplings or communication connections between the apparatuses or modules may be implemented in electronic, mechanical or other forms.

The units which are described as separate modules may be physically separated or may be not physically separated, and the components which are illustrated as modules may be or may not be physical modules, that is, the components may be located in the same position or may be distributed into a plurality of network modules. A part or all of the modules may be selected according to the actual needs to achieve the objectives of the technical solutions of the embodiments.

In addition, functional modules in the embodiments of the present application may be integrated into one processing module, or each of the modules may exist along physically, or two or more modules may be integrated into one module. The above integrated module may be implemented by using hardware, and may also be implemented by using a software function module.

If the integrated module is implemented by using the software function module, and is sold or used as an independent product, the integrated module may also be stored in a computer readable storage medium. Based on such an understanding, the technical solutions of the present application essentially, or the part contributing to the related art, or all or a part of the technical solutions may be implemented in a form of a software product. The computer software product is stored in a storage medium and includes several instructions to cause a computer device (which may be a personal computer, a server, a network device, or the like) to perform all or some of steps of the methods described in the embodiments of the present application. The storage media include various media capable of storing program code, for example, a U disk, a mobile hard disk, a read-only memory (ROM), a random access memory (RAM), a magnetic disk, or a compact disc read-only memory (CD-ROM).

It should be noted that, with respect to the above described method embodiments, for brevity of description, the actions or steps are all described as a series of action combinations. However, a person skilled in the art shall understand that the embodiments of the present application are not subjected to limitations of the action sequences described above. Further, based on the embodiments of the present application, some steps may be performed in another or other sequences or may be simultaneously performed. In addition, a person skilled in the art should also know that the embodiments described in the description herein are all preferred embodiments, and all the involved actions and modules are not mandatory ones of the embodiments of the present application.

In the above embodiments, descriptions give different particular emphases to various embodiments, and the portion of some embodiment that is not described may be referenced to the relevant description in other embodiments.

Detailed above describes a method for switching working mode of a headphone and a headphone. A person skilled in the art would derive various modifications to the specific embodiments and application scope thereof based on the inventive concept of the embodiments of the present application. In conclusion, the disclosure of this specification shall not be construed to limit the present application.

What is claimed is:

1. A method for switching working modes of a headphone, comprising:
   receiving, via a sound channel of the headphone, a signal sent by a smart terminal to the headphone, wherein the sound channel is also used to receive an audio signal sent by the smart terminal to the headphone;
   processing the received signal; and
   when the command indicative of switching the working modes of the headphone is obtained after the signal is processed, controlling, according to the command, a switch module of a microphone channel to switch the working modes such that the microphone channel is switchable between a call mode for transmitting call data via the microphone channel from the headphone to the smart terminal and an application data transmission mode for transmitting application data via the microphone channel from the headphone to the smart terminal, wherein the microphone channel is a channel formed via an electrical connection between a microphone of the headphone and the smart terminal and the microphone channel works as an uplink communication channel for transmitting call data or application data from the headphone to the smart terminal.

2. The method according to claim 1, wherein the controlling, according to the command, a switch module of the microphone channel to switch the working modes comprises:
   when the command is indicative of switching to the application data transmission mode, controlling the switch module to conduct an electrical connection between a modulation circuit and the microphone channel to switch the headphone to the application data transmission mode, such that the headphone sends, via the microphone channel, application data modulated by the modulation circuit to the smart terminal; and
   when the command is indicative of switching to the call mode, controlling the switch module to cut off the electrical connection between the modulation circuit and the microphone channel, and enabling the switch module to conduct the electrical connection between the microphone and the microphone channel to stop sending application data modulated by the modulation circuit to the smart terminal, and start transmitting call data via the microphone channel.

3. The method according to claim 2, wherein the microphone channel is a channel formed via an electrical connection between a microphone wire of a wired headphone and the smart terminal, or a channel formed via a radio connection between a microphone of a wireless headphone and the smart terminal.

4. The method according to claim 3, wherein the switch module is disposed in an uplink communication module, and comprises a first switch and a second switch, wherein the first switch is connected between the modulation circuit and a microphone input module of the smart terminal, when the first switch is switched on, the modulation circuit is connected to the microphone input module of the smart terminal, and when the first switch is switched off, the modulation circuit is disconnected from the microphone input module; and the second switch is connected between the microphone and the microphone input module, when the second switch is switched on, the microphone is connected to the microphone input module, and when the second switch is switched off, the microphone is disconnected from the microphone input module.

5. The method according to claim 1, wherein the signal further comprises an audio signal simultaneously sent by the smart terminal when the smart terminal sends the command indicative of switching the working mode of the headphone.

6. The method according to claim 5, wherein the processing the received signal comprises: filtering the received signal to obtain target data within a preset frequency range; and
demodulating and parsing the target data to obtain the command indicative of switching the working mode of the headphone.

7. The method according to claim 6, wherein the filtering the received signal comprises:
filtering an audio signal within the preset frequency range from the received signal, and filtering or attenuating all signals that are not within the preset frequency range from the received signal.

8. The method according to claim 7, wherein the demodulating and parsing the target data comprises:
demodulating the target data, and performing validity identification check for the demodulated target data; and
when the demodulated target data passes the validity identification check, parsing the demodulated target data.

9. The method according to claim 8, wherein the receiving, via a sound channel of the headphone, a signal sent by a smart terminal comprises:
receiving, via a left and/or right sound channel of the headphone in a ringing manner, the signal sent by the smart terminal.

10. The method according to claim 9, further comprising:
detecting a power consumption state of the headphone; and
when the power consumption state satisfies a preset condition, controlling the headphone to enter a preset low power consumption mode to work.

11. A headphone, comprising:
a data receiving module, configured to receive, via a sound channel of the headphone, a signal sent by a smart terminal to the headphone, wherein the sound channel is also used to receive an audio signal sent by the smart terminal to the headphone;
a data processing module, configured to process the received signal; and
a control module, configured to, when a command indicative of switching the working modes of the headphone is obtained after the signal is processed, control, according to the command, a switch module of a microphone channel to switch the working modes such that the the microphone channel is switchable between a call mode for transmitting call data via the microphone channel from the headphone to the smart terminal and an application data transmission mode for transmitting application data via the microphone channel from the headphone to the smart terminal, wherein the microphone channel is a channel formed via an electrical connection between a microphone of the headphone and the smart terminal and the microphone channel works as an uplink communication channel for transmitting call data or application data from the headphone to the smart terminal.

12. The headphone according to claim 11, wherein
the control module is specifically configured to, when the command is indicative of switching to the application data transmission mode, control the switch module to conduct an electrical connection between a modulation circuit and the microphone channel to switch the headphone to the application data transmission mode, such that the headphone sends, via the microphone channel, application data modulated by the modulation circuit to the smart terminal; and when the command is indicative of switching to the call mode, control the switch module to cut off the electrical connection between the modulation circuit and the microphone channel, and enable the switch module to conduct the electrical connection between the microphone and the microphone channel to stop sending application data modulated by the modulation circuit to the smart terminal, and start transmitting call data via the microphone channel.

13. The headphone according to claim 11, wherein the microphone channel is a channel formed via an electrical connection between a microphone wire of a wired headphone and the smart terminal, or a channel formed via a radio connection between a microphone of a wireless headphone and the smart terminal.

14. The headphone according to claim 13, wherein the switch module is disposed in an uplink communication module, and comprises a first switch and a second switch, wherein the first switch is connected between the modulation circuit and a microphone input module of the smart terminal, when the first switch is switched on, the modulation circuit is connected to the microphone input module of the smart terminal, and when the first switch is switched off, the modulation circuit is disconnected from the microphone input module; and the second switch is connected between the microphone and the microphone input module, when the second switch is switched on, the microphone is connected to the microphone input module, and when the second switch is switched off, the microphone is disconnected from the microphone input module.

15. The headphone according to claim 14, wherein the signal further comprises an audio signal simultaneously sent by the smart terminal when the smart terminal sends the command indicative of switching the working mode of the headphone.

16. The headphone according to claim 15, wherein the data processing module comprises:
a data filtering module, configured to filter a received signal to obtain target data within a preset frequency range; and
a data parsing module, configured to demodulate and parse the target data to obtain the command indicative of switching the working mode of the headphone.

17. The headphone according to claim 16, wherein
the data filtering module is specifically configured to filter an audio signal within the preset frequency range from the received signal, and filter or attenuate all signals that are not within the preset frequency range from the received signal.

18. The headphone according to claim 17, wherein the data parsing module is specifically configured to demodulate the target data, and perform validity identification check for the demodulated target data; and when the demodulated target data passes the validity identification check, parse the demodulated target data.

19. The headphone according to claim 18, wherein the data receiving module is specifically configured to receive, via a left and/or right sound channel of the headphone in a ringing manner, the signal sent by the smart terminal.

20. The headphone according to claim 19, further comprising:
a power consumption detecting module, configured to detect a power consumption state of the headphone; and
the control module is further configured to, when the power consumption state satisfies a preset condition, control the headphone to enter a preset low power consumption mode to work.

* * * * *